(12) United States Patent
Taylor et al.

(10) Patent No.: US 7,640,566 B1
(45) Date of Patent: Dec. 29, 2009

(54) DYNAMIC PAUSE BUFFER SIZING

(75) Inventors: Thomas H. Taylor, Redmond, WA (US);
Peter J. Potrebic, Calistoga, CA (US);
David J. Cheng, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 1340 days.

(21) Appl. No.: 10/139,906

(22) Filed: May 6, 2002

(51) Int. Cl.
*H04N 7/173* (2006.01)

(52) U.S. Cl. .......................... 725/88; 725/39; 725/134; 725/141; 386/45; 386/83

(58) Field of Classification Search ............. 725/37–61, 725/88–90, 134, 142; 386/1, 45, 83, 125, 386/126
See application file for complete search history.

(56) References Cited

U.S. PATENT DOCUMENTS

| | | | | |
|---|---|---|---|---|
| 5,974,218 | A * | 10/1999 | Nagasaka et al. | 386/46 |
| 6,177,931 | B1 * | 1/2001 | Alexander et al. | 725/52 |
| 6,501,511 | B2 * | 12/2002 | Sekimoto et al. | 348/553 |
| 6,598,228 | B2 * | 7/2003 | Hejna, Jr. | 725/91 |
| 6,711,741 | B2 * | 3/2004 | Yeo | 725/87 |
| 6,901,603 | B2 * | 5/2005 | Zeidler et al. | 725/39 |
| 6,931,657 | B1 * | 8/2005 | Marsh | 725/46 |
| 6,971,121 | B2 * | 11/2005 | West et al. | 725/142 |
| 7,096,482 | B2 * | 8/2006 | Fujita et al. | 725/32 |
| 7,127,735 | B1 * | 10/2006 | Lee et al. | 725/87 |
| 7,194,563 | B2 * | 3/2007 | Plourde, Jr. | 710/52 |
| 7,475,417 | B2 * | 1/2009 | Marsh | 725/58 |
| 7,509,028 | B2 * | 3/2009 | Ando et al. | 386/95 |
| 2002/0110353 | A1 * | 8/2002 | Potrebic et al. | 386/46 |
| 2002/0174430 | A1 * | 11/2002 | Ellis et al. | 725/46 |
| 2003/0118321 | A1 * | 6/2003 | Sparrell et al. | 386/68 |
| 2003/0206719 | A1 * | 11/2003 | Bumgardner et al. | 386/83 |

* cited by examiner

*Primary Examiner*—Annan Q Shang
(74) *Attorney, Agent, or Firm*—Lee & Hayes, PLLC (57) ABSTRACT

Memory is allocated to record a program being broadcast proportional to its remainder in a client device having a processor in communication with a receiver. The processor executes an application to allocate space in the memory to record the remainder of the broadcast of the program being received by the receiver that has a predetermined time length. The executing application obtains the predetermined time length from the broadcast received by the receiver and derives the remainder of the broadcast of the program from the present time and the predetermined time length obtained from the broadcast. The space can be logically erased prior to its allocation. A video recorder records the broadcast of the program being received by the receiver in the space in the memory. A video playback device plays back the recorded broadcast of the program from the space in the memory.

25 Claims, 6 Drawing Sheets

DYNAMIC PAUSE BUFFER SIZING

TECHNICAL FIELD

The present invention relates to recording a channel including programming content thereon that is being broadcast. More particularly, the present invention relates to recording a program being broadcast on a channel by allocating storage to record the remainder of the program.

BACKGROUND

Client devices in a television-based entertainment system include set top boxes such as cable boxes, satellite receivers, and video cassette recorders (VCRs). Some client devices have recording capabilities and can be set-up to record a television (TV) program currently being broadcast. As the client device outputs the TV program being broadcast for display on a TV, a pause function can be initiated by a viewer. The pause function requested by the viewer causes the client device to stop outputting the TV program for display on the TV. In some client devices, the pause function allows the client device to continue to store the TV program being broadcast in a pause buffer. When the viewer wishes to resume watching the TV program, the viewer initiates a playback function. The playback function requested by the viewer causes the client device to read the TV program stored in the pause buffer and to output therefrom the TV program for display on the TV. As such, the pause buffer at the client device allows the viewer to take a break from the TV program without missing a scene.

In a practical application, a viewer can pause the output of a TV program from a client device to a TV receiver as the TV program being watched and broadcast. To do so, the viewer initiates a pause function at the client device, such as by using a remote control device that communicates with the client device to execute the pause function. The pause function causes the display on the TV receiver that is output by the client device to appear as freeze-frame. The then-tuned TV program is routed to a codec for compression and recording into a pause buffer. The viewer can later use the remote control device to stop the pause function by selecting a playback function. The playback function causes the client device to output for display on the TV receiver the TV program that was recorded in the pause buffer. The output begins at the place in the TV program where the pause function was initiated. During the playback function the portion of the TV program that is presently being broadcast is continuously being recorded. As such, the client device records the TV program so that the viewer does miss any portion of the broadcast. A hard drive or other fixed storage device, as well as a video tape or other removable media, can be used by the client device as storage areas for the pause buffer.

Difficulties are encountered by a viewer when the viewer initiates the pause function but then does not return to resume watching the TV program for an extended time period. For example, the client device can have a fixed size for its pause buffer size. This fixed pause buffer size may be allocated to record only up to thirty (30) minutes of the TV program being broadcast. Alternatively, the size of the pause buffer can be variable and made subject to change, depending upon how much disk space is available in the hard drive storage device of the client device. In practice, a thirty (30) minute pause buffer may be too short of a time period. For instance, if the viewer pauses a one-hour TV program shortly after it begins, the client device will run out of storage area in its 30 minute pause buffer and the viewer will miss scenes at the end of the one-hour TV program. When client device fills up its pause buffer, it may be preconfigured to automatically begin outputting the content of the pause buffer for display at a time that the viewer is not present to watch the display. In view of this problem, one solution is to make the pause buffer size quite large with respect to the length of a typical TV program for a particular broadcast network system. On the other hand, if the pause buffer is made too large, then the maximum recording capacity of the client device is diminished. It would be an advance in the art to further the objective of allowing a viewer to pause a TV program being broadcast while recording the TV program in its entirety given the forgoing constraints. Consequently, there is a need for improved methods, apparatus, client devices, computer programs, and systems that can provide such a capability.

SUMMARY

Methods, apparatus, client devices, computer programs, and systems allocate memory to record a program being broadcast proportional to its remainder. In an implementation, a client device has a processor in communication with a receiver. The processor executes an application to allocate space in a memory to record a remainder of a broadcast of a program being received by the receiver that has a predetermined time length. The space is proportional to the remainder of the broadcast of the program. The executing application obtains the predetermined time length from the broadcast received by the receiver and derives the remainder of the broadcast of the program from the present time and the predetermined time length obtained from the broadcast. The space can be logically erased prior to its allocation. A video recorder records the broadcast of the program being received by the receiver in the space in the memory. A video playback device plays back the recorded broadcast of the program from the space in the memory.

DETAILED DESCRIPTION

An entertainment architecture enables a processor in communication with a receiver to execute an application to allocate space in a memory for recording a remainder of a broadcast of a program being received that has a predetermined time length. A video recorder records the remainder of the program being received by the receiver into a space that is allocated so as to be proportional to the remainder of the broadcast of the program. The predetermined time length and the program are received by a receiver from the broadcast.

The duration of the remainder is derived using the present time and the predetermined time length. A video playback device can play back the program recorded in the allocated space while the video recorder is recording the program in the allocated space.

The memory includes an electronic program guide (EPG) received from the broadcast and in which the predetermined time length of the program is stored. The EPG is typically continually supplied to the client device and includes information that relates to the programming content that will be broadcast in the future. More specifically, the guide data contains information that indicates, in advance, the starting time and duration of the programs that are described by the guide data. The EPG also includes the channel and the program title. With this information, the client device is able to start recording the program as the program is present on the selected channel at the EPG date and time and for the EPG duration. The video recorder can be configured to record the broadcast of the program on the channel when the client device is tuned to the channel. The video recorder can also be configured to record the broadcast of the program even though the client device has received a request to stop outputting the program for display on the TV, such as when a viewer has requested the client device to perform a pause function.

When the client device receives a request to perform a pause function and the pause continues through the end of the broadcast of the program, the chronologically next program received by the receiver on the channel will be stored in a space in the memory. The space in the memory is allocated to accommodate the duration of the next program as determined from its corresponding EPG data in the EPG. As the second program is being recorded, a play back or fast forward function received by the client device of the first program will logically erase a corresponding portion of the memory so as to free up the logically erased portion for future use. Implementations propose variations on memory management and logical erasure as are discussed below.

The discussion herein is directed to television-based entertainment systems, such as interactive TV networks, cable networks that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described methods and computer programs can be used in any of these systems and for any types of client devices, they are described in the context of the following exemplary environment.

Exemplary Environment

Figure 1:
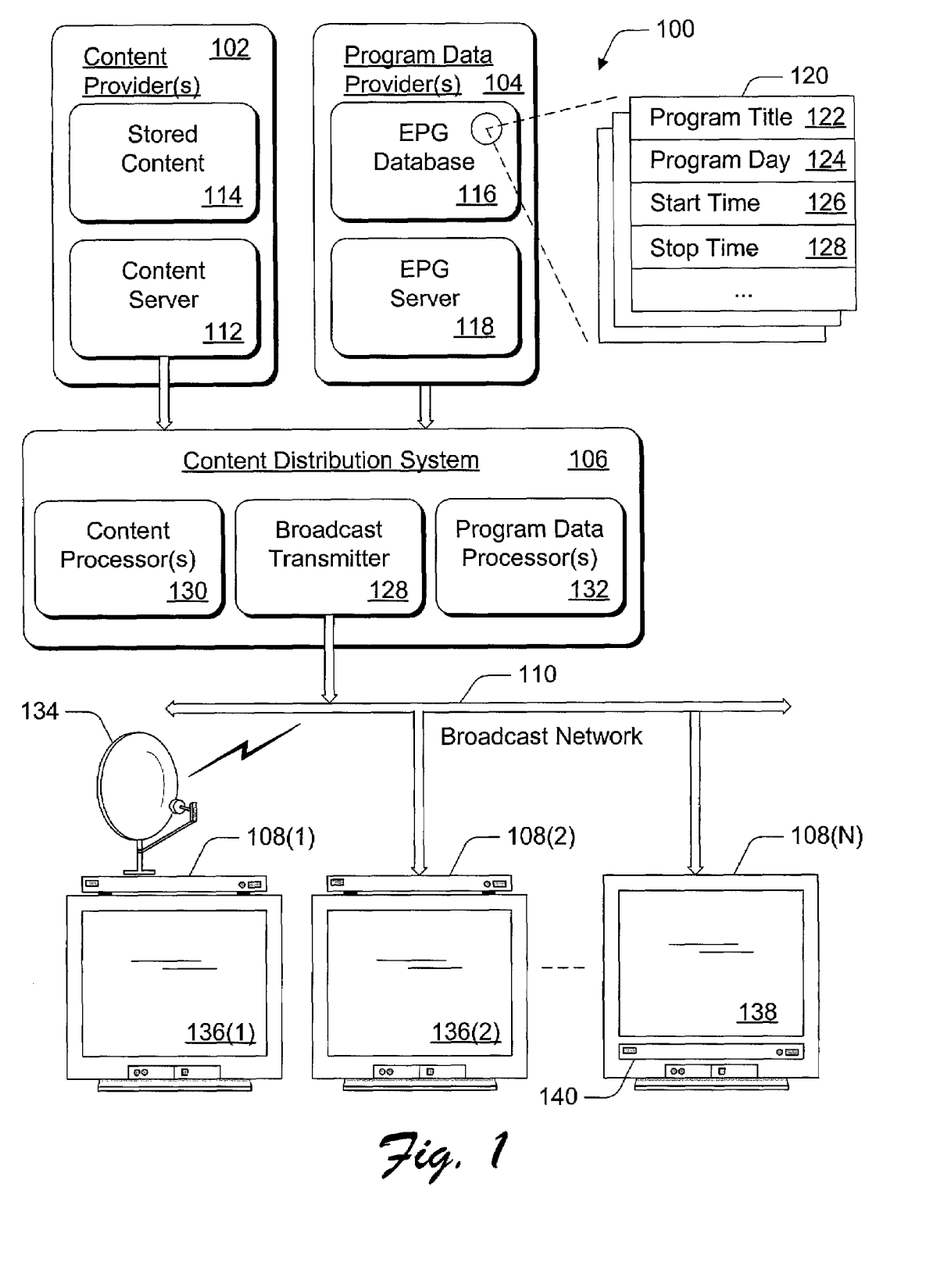
FIG. 1 illustrates an exemplary environment in which the methods, apparatus, client devices, computer programs, and systems described herein may be implemented.

FIG. 1 illustrates an exemplary environment 100 in which the methods, apparatus, client devices, computer programs, and systems described herein may be implemented. Exemplary environment 100 is a television entertainment system that facilitates distribution of content and program data to multiple viewers. The environment 100 includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content.

Content server 112 controls distribution of the stored content 114 from content provider 102 to the content distribution system 106. Additionally, content server 102 controls distribution of live content (e.g., content that was not previously stored, such as live feeds) and/or content stored at other locations to the content distribution system 106.

Program data provider 104 includes an electronic program guide (EPG) database 116 and an EPG server 118. The EPG database 116 stores electronic files of program data 120 which is used to generate an electronic program guide (or, "program guide"). Program data includes program titles, ratings, characters, descriptions, actor names, station identifiers, channel identifiers, schedule information, and so on. The terms "program data" and "EPG data" are used interchangeably throughout this discussion. For discussion purposes, an electronic file maintains program data 120 that may include a program title 122, a program day or days 124 to identify which days of the week the program will be shown, and a start time or times 126 to identify the time that the program will be shown on the particular day or days of the week.

The EPG server 118 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The EPG server 118 controls distribution of the published version of the program data from program data provider 104 to the content distribution system 106 using, for example, a file transfer protocol (FTP) over a TCP/IP network (e.g., Internet, UNIX, etc.). Further, the published version of the program data can be transmitted from program data provider 102 via a satellite 134 directly to a client device 108 by use of a satellite dish 134.

Content distribution system 106 includes a broadcast transmitter 128, one or more content processors 130, and one or more program data processors 132. Broadcast transmitter 128 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

Content processor 130 processes the content received from content provider 102 prior to transmitting the content across broadcast network 108. Similarly, program data processor 132 processes the program data received from program data provider 104 prior to transmitting the program data across broadcast network 110. A particular content processor 130 may encode, or otherwise process, the received content into a format that is understood by the multiple client devices 108(1), 108(2), . . . , 108(N) coupled to broadcast network 110. Although FIG. 1 shows a single content provider 102, a single program data provider 104, and a single content distribution system 106, exemplary environment 100 can include any number of content providers and/or program data providers coupled to any number of content distribution systems.

Content distribution system 106 is representative of a headend service that provides EPG data, as well as content, to multiple subscribers. Each content distribution system 104 may receive a slightly different version of the program data that takes into account different programming preferences and lineups. The EPG server 118 creates different versions of EPG data (e.g., different versions of a program guide) that include those channels of relevance to respective headend services, and the content distribution system 106 transmits the EPG data to the multiple client devices 108(1), 108(2), ..., 108(N). In one implementation, for example, content distribution system 106 utilizes a carousel file system to repeatedly broadcast the EPG data over an out-of-band (OOB) channel to the client devices 108.

Client devices 108 can be implemented in a number of ways. For example, a client device 108(1) receives broadcast content from a satellite-based transmitter via satellite dish 134. Client device 108(1) is also referred to as a set-top box or a satellite receiving device. Client device 108(1) is coupled to a television 136(1) for presenting the content received by the client device (e.g., audio data and video data), as well as a graphical user interface. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive broadcast content from broadcast network 110 and provide the received content to associated television 136(2). Client device 108(N) is an example of a combination television 138 and integrated set-top box 140. In this example, the various components and functionality of the set-top box are incorporated into the television, rather than using two separate devices. The set-top box incorporated into the television may receive broadcast signals via a satellite dish (similar to satellite dish 134) and/or via broadcast network 110. In alternate implementations, client devices 108 may receive broadcast signals via a two-way network, such as the Internet, or any other broadcast medium.

Each client device 108 runs an electronic program guide (EPG) application that utilizes the program data. An EPG application enables a television viewer to navigate through an onscreen program guide and locate television shows of interest to the viewer. With an EPG application, the television viewer can look at schedules of current and future programming, set reminders for upcoming programs, and/or enter instructions to record one or more television shows.

Optionally, one or more of the program data providers 104 can include stored on-demand content, such as Video On-Demand (VOD) movie content. The stored on-demand content can be viewed with a client device 108 through an onscreen movie guide, for example, and a viewer can enter instructions to stream a particular movie, or other stored content, down to a corresponding client device 108.

Exemplary Client Device

Figure 2:
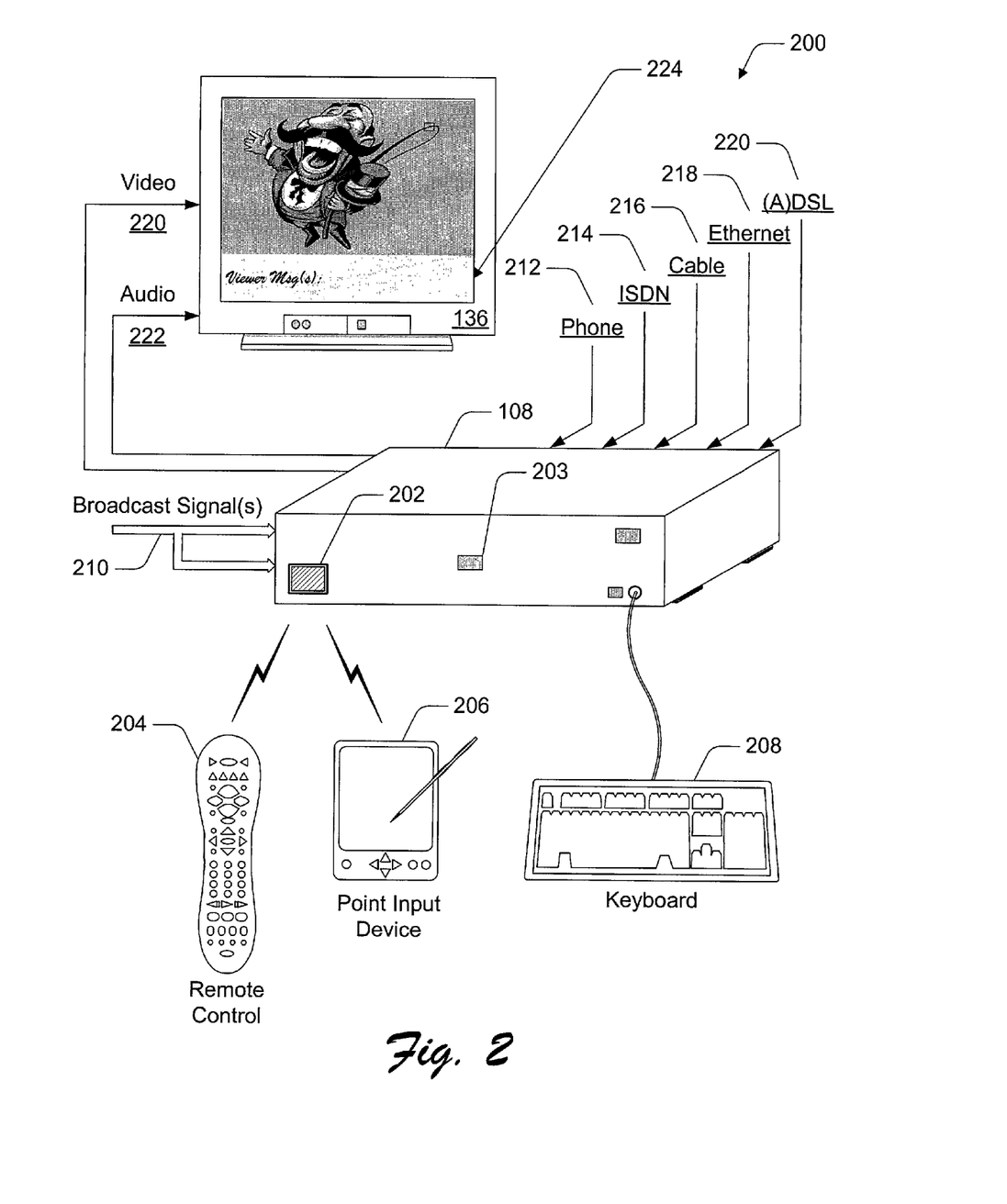
FIG. 2 illustrates of an example client device, a television, and various input devices that interact with the client device.

FIG. 2 illustrates an exemplary implementation 200 of a client device 108 shown as a standalone unit that connects to a television 136. Client device 108 can be implemented in any number of embodiments, including as a set-top box, a satellite receiver, a TV recorder with a hard disk, a game console, an information appliance, and so forth. Client device 108 includes a wireless receiving port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 is coupled to communicate with the client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network. Client device 108 includes hardware and/or software for receiving and decoding broadcast signal 210, such as an NTSC, PAL, SECAM or other TV system video signal. Client device 108 also includes hardware and/or software for providing the viewer with a graphical user interface by which the viewer can, for example, access various network services, configure the client device 108, and perform other functions.

Client device 108 is capable of communicating with other devices via one or more connections including a conventional telephone link 212, an ISDN link 214, a cable link 216, an Ethernet link 218, an ADSL and/or DSL link 220, and the like. Client device 108 may use any one or more of the various communication links 212-220 at a particular instant to communicate with any number of other devices and/or to establish a two-way communication with one or more network resources.

Client device 108 generates video signal(s) 220 and audio signal(s) 222, both of which are communicated to television 136. The video signals and audio signals can be communicated from client device 108 to television 136 via an RF (radio frequency) link, S-video link, composite video link, component video link, or other communication link. At reference numeral 203 in FIG. 2, client device 108 includes one or more lights or other indicators identifying the current status of the device or for diagnostic reports to a viewer. Additionally, the client device may include one or more control buttons, switches, or other selectable controls for controlling operation of the device.

In FIG. 2, television 136 shows a display line 224 which informs the viewer that client device 108 has output a diagnostic, such as that discussed below with respect to FIG. 6. This diagnostic can be issued to the viewer for their own edification and/or so that the viewer may take any action that may be warranted. Additionally, a diagnostic visual and/or audible alarm device or mechanism at reference numeral 203 can emit a diagnostic representative of that which is displayed at display line 224. In the alternative, both display line 224 and an alarm with the diagnostic visual and/or audible alarm device or mechanism at reference numeral 203 can be used so that the viewer may be warned visually and/or audibly.

Figure 3:
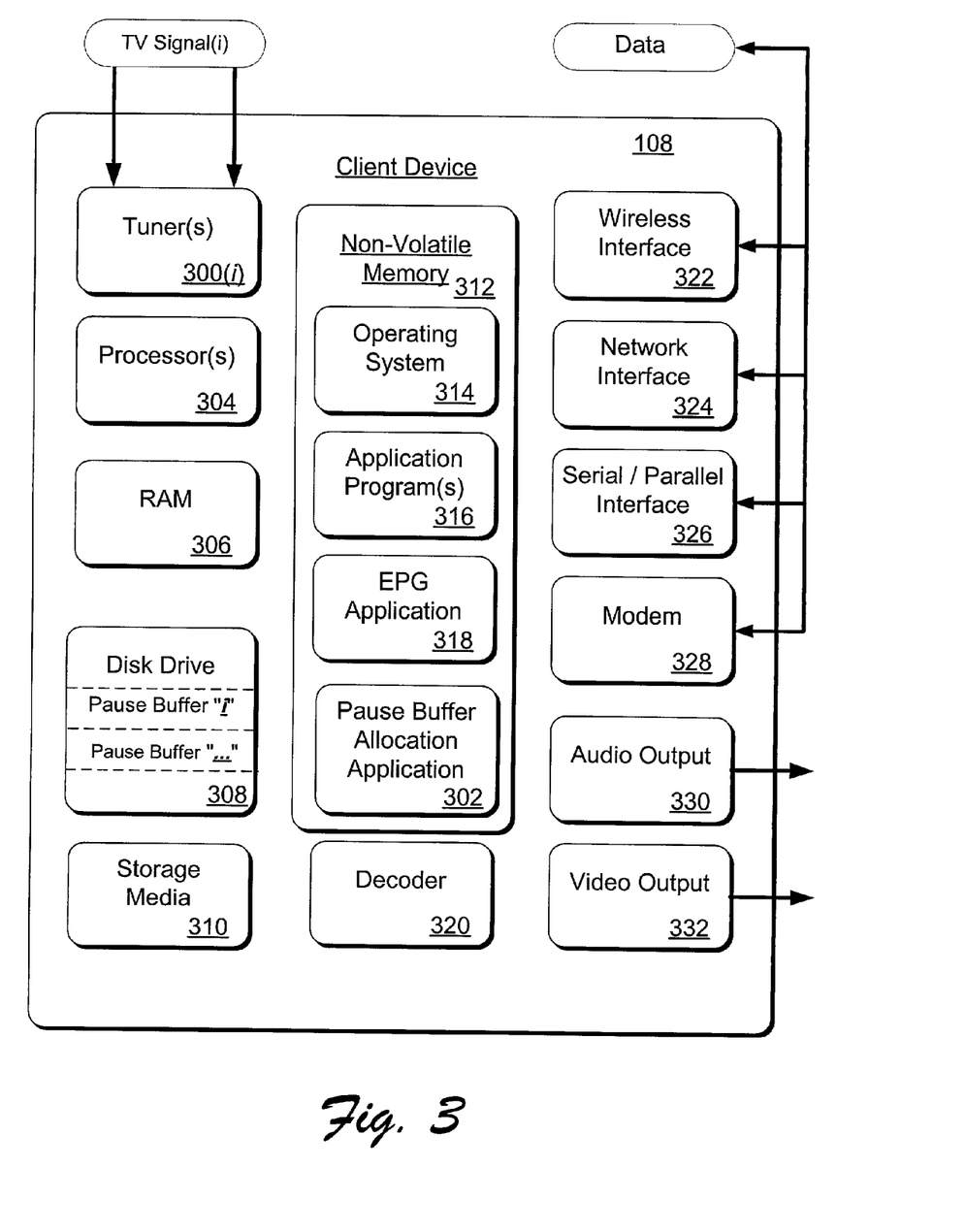
FIG. 3 is a block diagram that illustrates components of the example client device(s) shown in FIGS. 1-2.

FIG. 3 illustrates selected components of client device(s) 108 shown in FIGS. 1-2. Client device 108 includes one or more tuners 300(i). Tuners 300(i) are representative of one or more in-band tuners that tune to various frequencies or channels to receive television signals, as well as an out-of-band tuner that tunes to the broadcast channel over which the EPG data is broadcast to client device 108.

Client device 108 also includes one or more processors 304 and one or more memory components. Examples of possible memory components include a random access memory (RAM) 306, a disk drive 308, a mass storage component 310, and a non-volatile memory 312 (e.g., ROM, Flash, EPROM, EEPROM, etc.). Disk drive 308 can have one or a plurality of pause buffers (i) stored thereon. Pause buffers (i) can also be stored in one or more other memory devices, any one of which can be local or remote to client device 108. Alternative implementations of client device 108 can include a range of processing and memory capabilities, and may include more or fewer types of memory components than those illustrated in FIG. 3. For example, full-resource clients can be implemented with substantial memory and processing resources, including a disk drive 308 to store content for replay by the viewer. Low-resource clients, however, may have limited processing and memory capabilities, such as a limited amount of RAM 306, no disk drive 308, and limited processing capabilities. Nevertheless it is intended that client device 108 include a capability for video recording, either locally or remotely from client device 108.

Processor(s) 304 process various instructions to control the operation of client device 108 and to communicate with other electronic and computing devices. The memory components (e.g., RAM 306, disk drive 308, storage media 310, and non-volatile memory 312) store various information and/or data such as content, EPG data, configuration information for client device 108, and/or graphical user interface information.

An operating system 314 and one or more application programs 316 may be stored in non-volatile memory 312 and executed on processor 304 to provide a runtime environment. A runtime environment facilitates extensibility of client device 108 by allowing various interfaces to be defined that, in turn, allow application programs 316 to interact with client device 108. In the illustrated example, an EPG application 318 is stored in memory 312 to operate on the EPG data and generate a program guide. The application programs 316 that may be implemented at client device 108 can include a browser to browse the Web, an email program to facilitate electronic mail, and so on.

FIG. 3 shows non-volatile memory 312 having a pause buffer allocation application 302 which, when executed by processor(s) 304, allocates memory to record a program being broadcast proportional to its remainder. Pause buffer allocation application 302 executed by one or more processors 304 of EPG can be configured to allocate memory in any location within any memory device of client device 108, such as in non-volatile memory 312, RAM 306, disk drive 308, and/or storage media 310.

Client device 108 can communicate on a two-way network with various network resources using network interface 324, wireless interface 322, serial/parallel interface 326, modem 328, or other well known communication hardware/software algorithms and protocol for computing devices. Client device 108 can also include other components pertaining to a television entertainment system which are not illustrated in this example for simplicity purposes. For instance, client device 108 can include a user interface application and user interface lights, buttons, controls, etc. to facilitate viewer interaction with the device.

Client device 108 also includes a decoder 320 to decode a broadcast video signal, such as an NTSC, PAL, SECAM or other TV system video signal. Alternatively, a decoder for client device 108 can be implemented, in whole or in part, as a software application executed by processor(s) 304. Wireless interface 322 allows client device 108 to receive input commands and other information from a viewer-operated input device, such as from a remote control device or from another IR, Bluetooth, or similar RF input device.

Network interface 324 and serial and/or parallel interface 326 allows client device 108 to interact and communicate with other electronic and computing devices via various communication links. Although not shown, client device 108 may also include other types of data communication interfaces to communicate with other devices. Modem 328 facilitates client device 108 communications with other electronic and computing devices via a conventional telephone line. Components seen at reference numerals 316 and 322-328 facilitate applications where client device 108 has Internet access or communicates data on a two-way network.

Client device 108 also includes an audio output 330 and a video output 332 that provide signals to a television or other device that processes and/or presents or otherwise renders the audio and video data. Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is been made herein to one or more client devices, such as client device 108. As used herein, "client device" means any electronic device having data communications, data storage capabilities, and/or functions to process signals, such as broadcast signals, received from any of a number of different sources.

Figure 4:
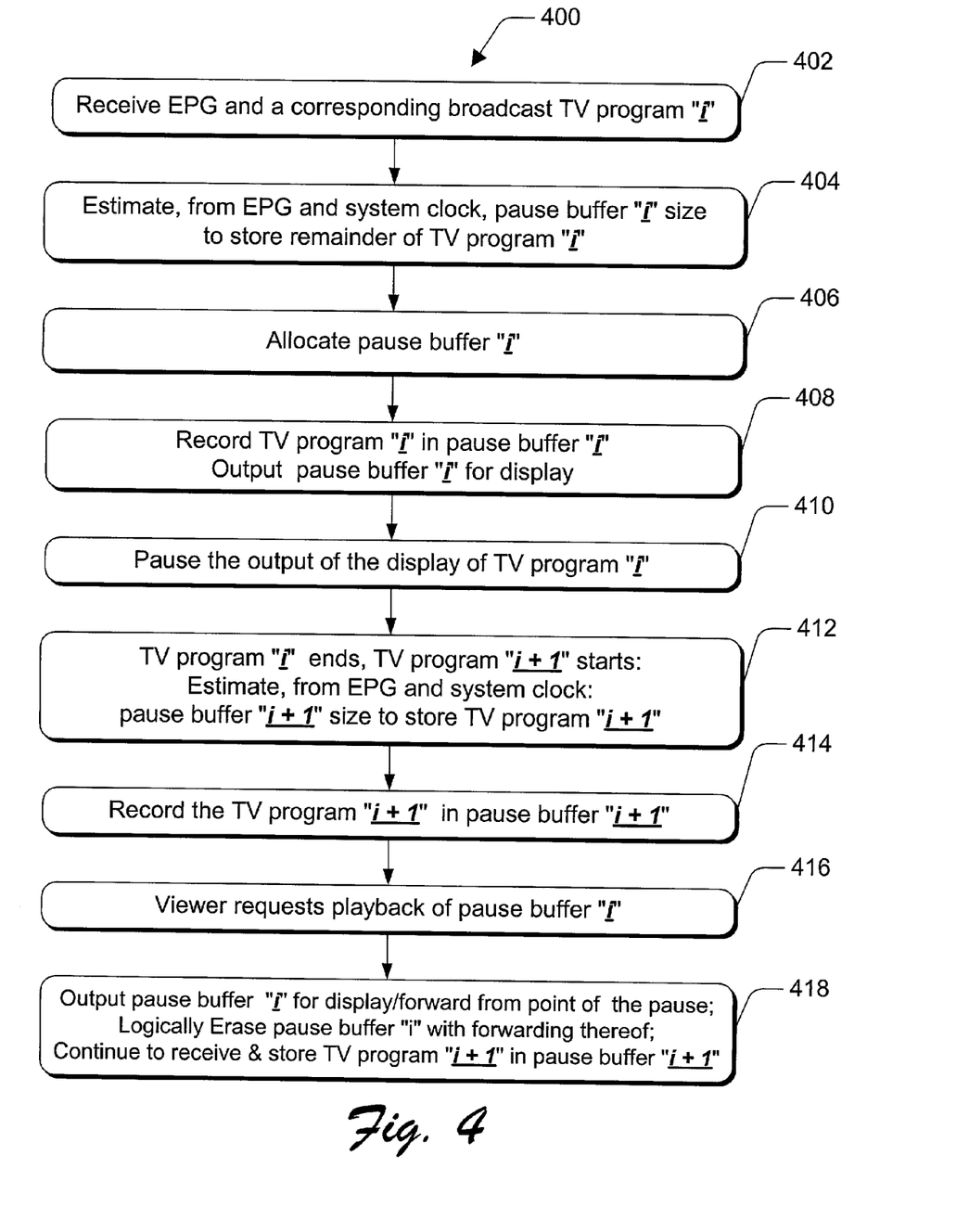
FIG. 4 is a flow diagram that illustrates a procedure for recording a program being broadcast proportional to its remainder.

FIG. 4 shows a method for allocating memory to record a program being broadcast proportional to its remainder. The order in which the method is described is not intended to be construed as a limitation, and any number of the described method blocks can be combined in any order to implement the method. Furthermore, the method can be implemented in any suitable hardware, software, firmware, or combination thereof.

A process 400 is seen in FIG. 4 which can be used, for example, with respect to environments 100, 200 depicted, respectively, in FIGS. 1-2. Process 400 proceeds at block 402 where a client device has received EPG data and a corresponding TV program (i) that is being broadcast on a channel. Process 400 then moves to block 404 where the client device estimates the size of a pause buffer (i) that is to be allocated in a memory device of the client device so that the remainder of TV program (i) will be stored. In one implementation, the size of the pause buffer (i) can be calculated using data from the EPG and the present time. Other factors, however, also might be taken into account when calculating the size of the pause buffer. These factors include the amount of MPEG compression of the signal, the amount of "action" in the show (e.g. a sports broadcast typically consumes more space on disk than a news show), whether the channel is a local channel or a premium Pay-per-View channel, whether the signal is an HDTV signal, etc. For a TV show that is broadcast in digital signals, like those from a satellite broadcast service (e.g. DirecTV and DiSH), the exact amount of space required to record the TV show can not be readily calculated because of the variable bit-rate of the transmission. As such, the client device can only estimate the size of pause buffer (i) that is required. Alternatively, some broadcast systems that do their own compression can readily identify the size of pause buffer (i) that is required in that any such system has a predetermined size into which a predetermined broadcast duration will be compressed (e.g. X minutes of video to be broadcast is predetermined to compress into Y megabytes of storage space).

The present time can be obtained from the broadcast received by the client device, by a system clock of the client device, by input from the viewer that is made to the client device, or by other knows means. At block 406, the estimated memory size is allocated for pause buffer (i). At block 408, the TV program (i) being received on the broadcast of the channel by the client device is recorded in pause buffer (i).

At block 410, a viewer requests that output be paused from the client device for display of TV program (i) on a display device, such as a TV. The client device then performs a pause function. During the pause function, while the pause buffer (i) continues to be recorded with the TV program being received by the client device on the broadcast of the channel, the output from the client device for display on a TV stops. The display on the TV during the pause function may be, for example, a still picture of the last image output from the client device at the time that the pause function was initiated.

Process 400 moves to block 412 at which time TV program (i) ends according to corresponding data in the EPG, pause buffer (i) contains a recording of the remainder of the broadcast of TV program (i), and a broadcast of a TV program (i+1) begins on the channel according to corresponding data in the EPG. The client device then estimates, from the EPG data and the present time, the size of a pause buffer (i+1) that is to be allocated in the memory device of the client device so that the remainder of TV program (i+1) will be stored. At block 412, the estimated memory size is allocated for pause buffer (i+1) and the TV program (i+1) being received on the broadcast of the channel by the client device is recorded in pause buffer (i+1). As such, the beginning of the broadcast of TV program (i+1) is stored in pause buffer (i+1).

The pause buffer, in one implementation, can be a storage area in a memory device. This storage area can be reallocated in size as it is being used by a client device as a pause buffer. The client device can write additional index points to delimit the beginning of each television program that is stored in the storage area while the client device executes a pause buffer function.

At block 416, the viewer inputs a command to the client device to resume the output of TV program (i) for display on the TV. Process 400 moves to block 418 where the client device outputs for display to the TV the contents of TV program (i) that is stored pause buffer (i). The point in TV program (i) at which the output begins corresponding to the point at which the viewer initiated the pause function. As such, the viewer resumes watching the paused TV program (i) where they left off without missing any portion of TV program (i). During the play back of TV program (i) from pause buffer (i), the client device continues to store TV program (i+1) in corresponding pause buffer (i+1).

In order to conserve memory in the client device in one implementation, the client device can be configured such that a corresponding portion of pause buffer (i) is logically erased as the viewer advances the playback of pause buffer (i). As such, the logically erased portion of pause buffer (i) is any portion thereof that is either played back, fast forwarded, or otherwise moved in a forward direction. In yet another implementation, the client device can be configured to logically erase portions of pause buffer (i) in discrete increments of a predetermined number of play back minutes. For example, after a viewer had played back or fast forwarded four (4) minutes from pause buffer (i), no portion thereof would be logically erased. After the viewer had played back or fast forwarded five (5) minutes of the playback from pause buffer (i), those five (5) minutes would be then be logically erased. As such, the viewer would be permitted to go backwards less then five (5) minutes during any playback whenever the client device was recording to a pause buffer other then the one currently be played back. In either of the two (2) foregoing implementations, the logically erased portion is made available for other memory management functions, such as for the allocation and use for another pause buffer. Of course, the client device can be configured to logically erase memory in other ways so that additional digital video recordings can be stored into memory.

After block 418 various options can be implemented. Process 400 can set i=i+1 and then return block 412 to record the next TV program (i+1) that is to be broadcast on the channel, and can again allocate an estimated pause buffer size for the recording thereof. The memory of the client device, however, may not be sufficient to allow further pause buffers to be allocated. In this case, the client device can be configured to delete the earliest pause buffer in favor of a subsequent pause buffer that is being estimated and allocated (e.g. a First-In-First-Erased schema). In another implementation, when the client device lacks sufficient memory for an additional pause buffer, the earliest pause buffers can be kept while additional pause buffers are not allocated. Other implementations are also contemplated for which a client device may be configured using the present patent as a guide.

Figure 5:
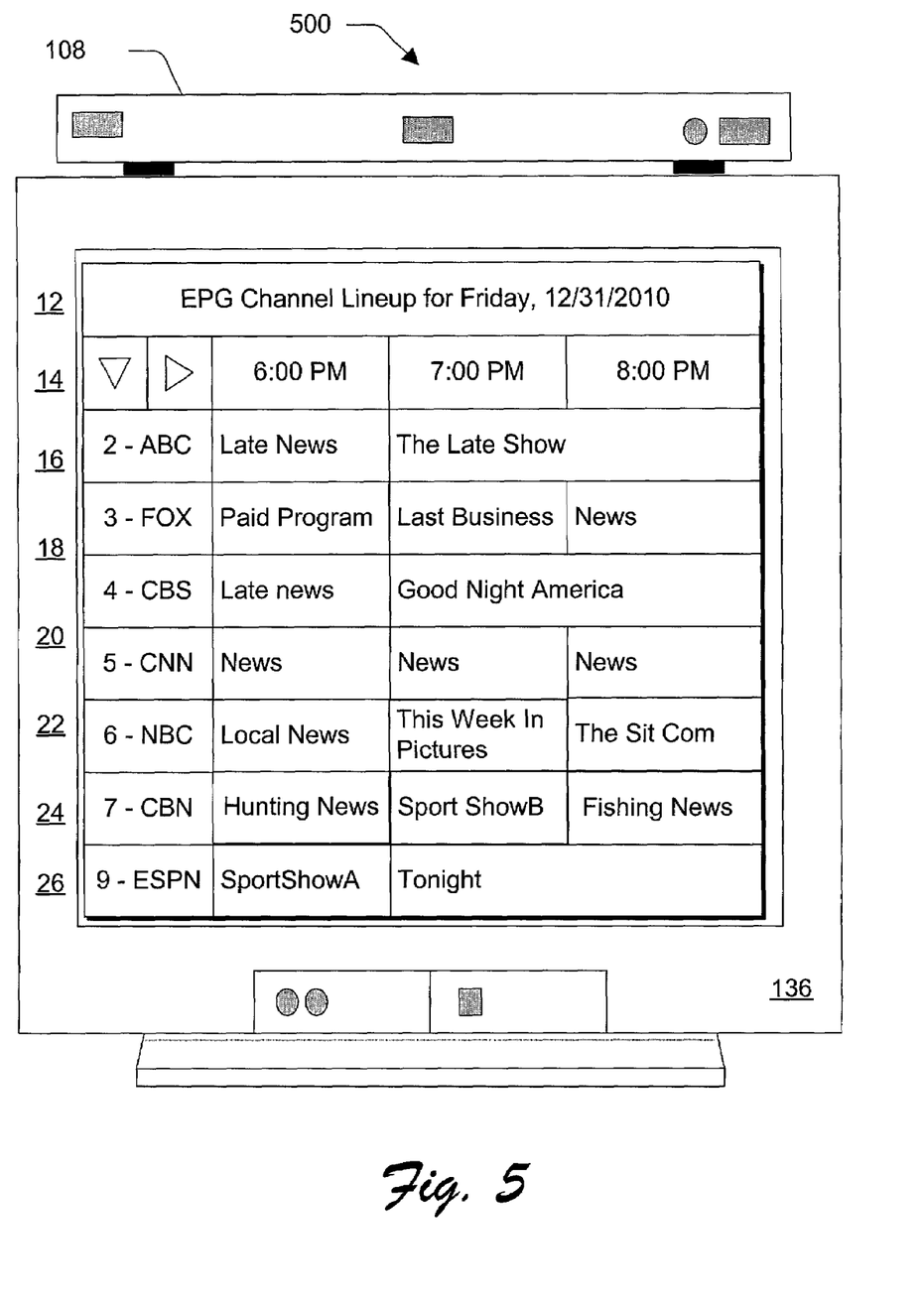
FIG. 5 illustrates, in a front elevation view, an exemplary environment in which a client device has received input including a section of an electronic program guide (EPG) which is displayed upon a television.

With reference to FIG. 5, an exemplary system 500 for implementing an entertainment architecture includes client device 108 in communication with television 136. Television 136 has display lines 12 through 26 where there is displayed an example of a program guide showing part of a channel programming lineup for Friday, Dec. 31, 2010. The program guide is generated with an electronic program guide (EPG) application in client device 108 with program data, where part of the program data is displayed on television 136. The program guide provides a viewer with a program title, the associated local channel number and/or television broadcasting company that will broadcast the program, and a time of the day that the program will be broadcast.

The program guide assists a viewer to identify and select a program title that the viewer wishes to view or record if the program is currently being broadcast, access program data to learn more about the program, and/or enter a request to record the program if the program is to air in the future. A viewer can move within the program guide, using an input device such as a remote control device, to input control commands to client device 108.

In display line 12, an explanation for the display on television 136 is given that the display shows a portion of the EPG channel lineup for the date Friday, Dec. 31, 2010. Display line 14, in the first column thereof, shows scrollable user interface icons. The first icon in the first column of display line 14 indicates that a viewer can scroll vertically to show various channels for the 6:00 P.M. to 9:00 P.M. time period. The second icon in the second column of display line 14 indicates that the viewer can scan chronologically forward and backwards for each of the displayed channels 2 through 9. The second, third and fourth columns indicate the timeslots 6 P.M., 7 P.M., and 8 P.M. Display line 16 shows the lineup for channel 2, the "ABC" television broadcast network. As seen in the second column of display line 16 two programs are indicated, namely the Late News at 6 P.M. and the Late Show at 7 P.M. FIG. 5 indicates in display line 26 that Sport Show A begins at 6 P.M. and continues until 7 P.M. on channel 9 on the ESPN television broadcast network.

In FIG. 5, display line 24 for the display on television 136 shows the channel 7 line up for the CBN network. The line up includes several chronologically adjacent TV programs to be broadcast on Channel 7, including the Hunting News to begin at 6:00 P.M. and to continue until 7:00 P.M., the Sport Show B to begin at 7:00 P.M. and to continue until 8:00 P.M., and the Fishing News to begin at 8:00 P.M.

Figure 6:
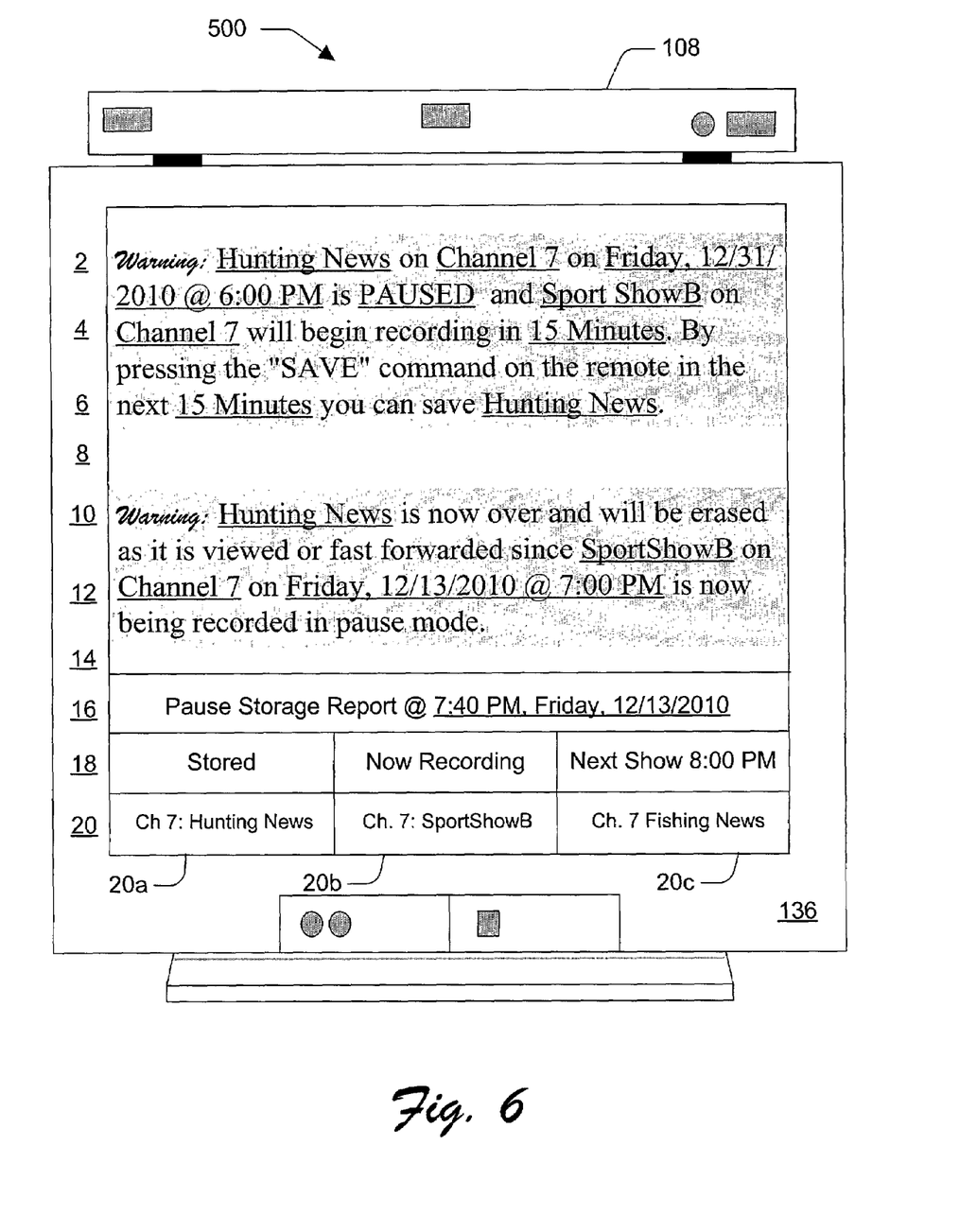
FIG. 6 shows the client device outputting diagnostics for display on the television of FIG. 5.

With reference to FIG. 6, the exemplary system 500 shows television 136 having a display in display lines 2 through 20 in which various diagnostics are output by client device 108 for display on television 136 to be observed by a viewer. Three (3) diagnostics are seen in FIG. 6. The first diagnostic is seen in FIG. 6 at display lines 2 through 4 and is indicative of a circumstance where a viewer has initiated a pause function so as to halt the output of the Hunting News from the client device 108 to the television 136. The next program is Sport Show B which is scheduled to begin, according to EPG data stored in client device 108, in 15 minutes. As such, the first diagnostic indicates that the viewer has 15 minutes to save the pause buffer to a permanent file. After five minutes, however, the pause buffer may be deleted, the client device may not be able to permanently save the pause buffer, or the contents of the pause buffer may be subject to other and/or additional consequences that are not otherwise indicated in the display of the first diagnostic.

The second diagnostic is seen in FIG. 6 at display lines 10 through 13 and is indicative of a circumstance where a viewer has tuned to channel 7 during the output of the Hunting News from the client device 108 to the television 136. The chronologically next program after the Hunting News, Sport Show B, has begun broadcasting on Channel 7. Moreover, the Sport Show B program is being recorded into a pause buffer that has been sized to correspond with EPG data stored in client device 108. As such, the second diagnostic indicates that the viewer can still view the Hunting News stored in the corresponding pause buffer. A consequence of the pause function, however, is set forth in the second diagnostic. The effect of the consequence is that the client device will logically erase the Hunting News from the corresponding pause buffer as it is advanced by way of a play back function, a fast forward function, and/or other forward progression functions such as forward in slow motion, etc.

The third diagnostic, which is an example of a demand report, is seen in FIG. 6 at display lines 16 through 20. The example demand report may be requested by a viewer to be displayed upon television 136. The circumstance under which the example report is displayed on TV 136 is where a viewer has initiated a pause function with client device 108, all or a portion of the Hunting News on Channel 7 has been stored in a pause buffer, the Sports Show B on Channel is being broadcast and recorded by client device 108 in another pause buffer, and the pause function has not yet by terminated by the viewer. The viewer can use an input device to request that the client device 108 output the report for display. The report, once displayed, informs the viewer of the pause buffer inventory stored in client device 108 while also informing the viewer as to the next show that is scheduled to be recorded into yet another pause buffer. At reference numeral 20*a* of display line 20, it is seen that the Hunting News from Channel 7 has been stored in a pause buffer and is available for viewing. Also available for viewing is the Sports Show B which is currently being broadcast on Channel 7 while it is simultaneously being stored in a corresponding pause buffer, as indicated at reference numeral 20*b*. Reference numeral 20*c* in display line 20 shows that the Fishing News on channel 7 will be recorded in a pause buffer as soon as it begins broadcast at 8:00 P.M. The times listed in FIG. 6 can be obtained from EPG data stored in client device 108, from viewer input to client device 108, or by other communication client device 108 such as by two-way network.

Once the current time, the EPG start time, and the duration are known, the remaining duration of a TV program being broadcast on a channel can be calculated. From this duration, the size of the pause buffer needed to store the remainder of the broadcast can be estimated by a variety of known techniques. In the event that the EPG data changes with respect to a TV program that is currently being recorded into a pause buffer, the client device can then dynamically reallocate the size of the pause buffer. This reallocation can occur while the viewer is watching a playback from the pause buffer as the TV program is being recorded in the pause buffer. The EPG data change can be received from another source, such as from a two-way network, from the viewer making an input to the client device, and/or from other sources.

The client device can be configured to allow a viewer to override the operations of the client device. For instance, if the client device is configured to stop writing to a pause buffer at the end of a TV program as determined from the EPG, but the viewer knows that the TV program will be extended beyond the actual time set forth in the corresponding EPG data, then the viewer can input a new time into the client device. The client device can then use the viewer input time to reallocate the pause buffer and continue recording the TV program into the reallocated pause buffer past the EPG stopping time to the end of the viewer input time. This feature can be helpful when a viewer initiates a pause function while watching a type of TV program that will typically go beyond the EPG stopping time, such as a sporting event or a live broadcast. Of course, the viewer can also change the stopping time to be before that of the corresponding EPG data stopping time, and to which the client device will response accordingly. In either case, the client device can be configured to prompt the viewer for instructions to extend or shorten the pause buffer recording time, recording size, or other variable such as recording quality that might affect the estimated size of the pause buffer that is to be allocated. In another implementation, such as where the viewer is given only a few minutes before the end of TV program to permanently save the recording in the pause buffer, the client device can output a diagnostic for display to inform the viewer that the viewer will be given a longer time to save the TV program permanently if the viewer selects an option to extend the size of the pause buffer.

Implementations extend to methods, apparatus, client devices, computer programs, and systems for recording a program being broadcast proportional to its remainder. The implementations may comprise a special purpose or general purpose computer including various computer hardware as discussed by way of example in greater detail above. Implementations also include computer-readable media for having computer-executable instructions or data structures stored thereon. Such computer-readable media can be any available media which can be accessed by a general purpose or special purpose computer. One example of a special purpose computer is a set top box. By way of example, and not limitation, such computer-readable media can comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. Combinations of the above should also be included within the scope of computer-readable media. Computer-executable instructions comprise, for example, instructions and data which cause a general purpose computer, special purpose computer, or special purpose processing device to perform a certain function or group of functions.

The Figures and the foregoing discussion are intended to provide a brief, general description of a suitable computing environment in which the invention may be implemented. Although not required, the invention has been described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including set top boxes, personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A client device having a memory device storing a plurality of EPG entries each corresponding to a television program of a predetermined time length presently being broadcast on a channel, the client device comprising:

means for selecting a first EPG entry having a corresponding first television program on a corresponding first channel of a broadcast network;

means for determining, from the present time and the predetermined time length of the first television program, a first residual time length that the first television program will be broadcast on the first channel of the broadcast network;

means for estimating a first amount of memory in the memory device sufficient to record the first television program for the first residual time length;

means for logically erasing from the memory device any prerecorded portions therein sufficient to provide the first amount of the memory;

means for receiving, and for outputting a display of, the broadcast of the first television program on the first channel of the broadcast network;

means for recording, for the first residual time length, the first television program in the first amount of the memory in the memory device;

means for stopping, at a first time during the recording of the first television program, the output of the display of the broadcast of the first television program, wherein a first portion of the first amount of memory stores an outputted portion of the first television program, the outputted portion beginning from the start of the recording of the first television program and ending at the first time, and wherein a second portion of the first amount of memory stores an un-outputted portion of the first television program beginning from the first time, wherein the second portion of the first amount of memory comprises at least one byte;

means for selecting a second said EPG entry chronologically following the first said EPG entry and having a corresponding second television program of a predetermined time length being broadcast on a second channel;

means for estimating a second amount of memory in the memory device sufficient to record the predetermined time length of the second television program;

means for logically erasing from the memory device the first portion of the first amount of memory without logically erasing from the memory device the second portion of the first amount of memory;

means for receiving the broadcast of the second television program on the second channel of the broadcast network;

means for recording the second television program in the second amount of memory in the memory device;

means for outputting, after said stopping, the display of the broadcast of the first television program from a play back of the first television program in the second portion of the first amount of the memory in the memory device from a corresponding point therein equal to or chronologically forward of the first time;

means for logically erasing from the memory device parts of the second portion of the first amount of memory corresponding to parts of the first television program that have been played back; and means for forming a diagnostic corresponding to that which is logically erased by the means for logical erasing of the second portion of the first amount of memory, the diagnostic communicating that the first television program will be erased as it is viewed.

2. The client device as defined in claim 1, wherein the means for logically erasing from the memory device erases any prerecorded portions thereof sufficient to provide the second amount of memory in the memory device.

3. The client device as defined in claim 1, wherein the means for outputting after said stopping and the means for logically erasing of the second portion of the first amount of memory perform substantially simultaneously.

4. The client device as defined in claim 1, wherein the second portion of the first amount of memory has a predetermined time length.

5. The client device as defined in claim 1, wherein forming the diagnostic further comprises means for outputting the diagnostic in a visible display characterizing an availability of the portion of the first television program stored in the second portion of the first amount of memory for a playback thereof.

6. The client device as defined in claim 1, further comprising:

means for fast-forwarding, after said stopping, the display of the broadcast of the first television program from a play back of the first television program in the first amount of the memory in the memory device from a corresponding point therein equal to or chronologically forward of the first time; and means for logically erasing from the memory device the portion of the recording broadcast that has been fast-forwarded after said stopping.

7. The client device as defined in claim 1, further comprising:
- means for playing, after said stopping, the display of the broadcast of the first television program from a play back of the first television program in the first amount of the memory in the memory device from a corresponding point therein equal to or chronologically forward of the first time; and
- means for logically erasing from the memory device the portion of the recording broadcast that has been played after said stopping.

8. In a client device having a memory device storing a plurality of EPG entries each corresponding to a television program of a predetermined time length presently being broadcast on a channel, a receiver for receiving any said television program having a corresponding said EPG entry, and a video recorder for recording any received said television program, a method comprising:
- selecting a first EPG entry having a corresponding first television program on a corresponding first channel of a broadcast network;
- determining, from the present time and the predetermined time length of the first television program, a first residual time length that the first television program will be broadcast on the first channel of the broadcast network;
- estimating a first amount of memory in the memory device sufficient to record the first television program for the first residual time length;
- logically erasing from the memory device any prerecorded portions therein sufficient to provide the first amount of the memory;
- receiving, and outputting a display of, the broadcast of the first television program on the first channel of the broadcast network;
- recording, for the first residual time length, the first television program in the first amount of the memory in the memory device;
- stopping, at a first time during the recording of the first television program, the output of the display of the broadcast of the first television program, wherein a first portion of the first amount of memory stores an outputted portion of the first television program from the beginning of the recording of the first television program to the first time, and wherein a second portion of the first amount of memory stores an un-outputted portion of the first television program beginning from the first time, and wherein the second portion of the first amount of memory comprises at least one byte;
- selecting a second said EPG entry chronologically following the first said EPG entry and having a corresponding second television program of a predetermined time length being broadcast on a second channel;
- estimating a second amount of memory in the memory device sufficient to record the predetermined time length of the second television program;
- logically erasing from the memory device the first portion of the first amount of memory without logically erasing from the memory device the second portion of the first amount of memory;
- receiving the broadcast of the second television program on the second channel of the broadcast network;
- recording the second television program in the second amount of memory in the memory device with the video recorder; and
- outputting, after said stopping, the display of the broadcast of the first television program from a play back of the first television program in the first amount of the memory in the memory device from a corresponding point therein equal to or chronologically forward of the first time;
- logically erasing from the memory device the second portion of the first amount of memory corresponding to the play back thereof; and
- forming a diagnostic corresponding to the logical erasing of the second portion of the first amount of memory, the diagnostic communicating the first television recording will be deleted to reclaim memory for use recording the second television program.

9. The method as defined in claim 8, further comprising:
- outputting for display a diagnostic characterizing any said television program recorded by the video recorder that is stored in the memory device; and
- receiving an input instruction to prevent logical erasure of one said television program recorded by the video recorder that is stored in the memory device and that corresponds to any said television program in the diagnostic.

10. The method as defined in claim 9, further comprising forming an indicator to mark the any said television program in the diagnostic as a portion of the memory device that is not be logically erased.

11. The method as defined in claim 8 wherein the logically erasing from the memory device further comprises:
- any prerecorded first portions of the first amount of memory sufficient to provide the second amount of memory in the memory device.

12. The method as defined in claim 8, wherein the outputting after said stopping and the logically erasing of the second portion of the first amount of memory are substantially simultaneous.

13. The method as defined in claim 8, wherein the second portion of the first amount of memory has a predetermined time length.

14. The method as defined in claim 8, wherein forming the diagnostic further comprises outputting the diagnostic in a visible display characterizing an availability of the portion of the first television program stored in the second portion of the first amount of memory for a playback thereof.

15. One or more computer-readable storage media comprising computer-executable instructions that, when executed, direct a computing system to perform the method of claim 8.

16. One or more computer-readable storage media comprising computer-executable instructions that, when executed on one or more processors, perform acts comprising:
- selecting a first EPG from a plurality of EPG entries each corresponding to a television program of a predetermined time length presently being broadcast on a channel, the entry having a corresponding first television program on a corresponding first channel of a broadcast network;
- determining, from the present time and the predetermined time length of the first television program, a first residual time length that the first television program will be broadcast on the first channel of the broadcast network;
- estimating a first amount of memory in the memory device sufficient to record the first television program for the first residual time length;

logically erasing from the memory device any prerecorded portions therein sufficient to provide the first amount of the memory;

receiving, and outputting a display of, the broadcast of the first television program on the first channel of the broadcast network;

recording, for the first residual time length, the first television program in the first amount of the memory in the memory device;

stopping, at a first time during the recording of the first television program, the output of the display of the broadcast of the first television program, wherein a first portion of the first amount of memory stores an outputted portion of the first television program from the beginning of the recording of the first television program to the first time, and wherein a second portion of the first amount of memory stores an un-outputted portion of the first television program beginning from the first time, and wherein the second portion of the first amount of memory comprises at least one byte;

selecting a second said EPG entry chronologically following the first said EPG entry and having a corresponding second television program of a predetermined time length being broadcast on a second channel;

estimating a second amount of memory in the memory device sufficient to record the predetermined time length of the second television program;

logically erasing from the memory device the first portion of the first amount of memory without logically erasing from the memory device the second portion of the first amount of memory;

receiving the broadcast of the second television program on the second channel of the broadcast network;

recording the second television program in the second amount of memory in the memory device;

outputting, after said stopping, the display of the broadcast of the first television program from a play back of the first television program in the first amount of the memory in the memory device from a corresponding point therein equal to or chronologically forward of the first time;

logically erasing from the memory device the second portion of the first amount of memory corresponding to the play back of the first television program; and forming a diagnostic corresponding to the logical erasing of the second portion of the first amount of memory, the diagnostic communicating a pause buffer inventory stored in the first amount of memory.

17. The one or more computer-readable storage media of claim 16, wherein the logically erasing from the memory device further comprises:

logically erasing any prerecorded first portions of the first amount of memory sufficient to provide the second amount of memory in the memory device.

18. The one or more computer-readable storage media of claim 16, wherein the outputting after said stopping and the logically erasing of the second portion of the first amount of memory are substantially simultaneous.

19. The one or more computer-readable storage media of claim 16, wherein the second portion of the first amount of memory has a predetermined time length.

20. The one or more computer-readable storage media of claim 16, wherein forming the diagnostic further comprises outputting the diagnostic in a visible display characterizing an availability of the portion of the first television program stored in the second portion of the first amount of memory for a playback thereof.

21. A system comprising:

one or more computer-readable storage media;

one or more processors; and computer-readable instructions on the computer-readable storage media which, when executed by the one or more processors, cause the one or more processors to implement a method comprising:

selecting a first EPG from a plurality of EPG entries each corresponding to a television program of a predetermined time length presently being broadcast on a channel, the entry having a corresponding first television program on a corresponding first channel of a broadcast network;

determining, from the present time and the predetermined time length of the first television program, a first residual time length that the first television program will be broadcast on the first channel of the broadcast network;

estimating a first amount of memory in the memory device sufficient to record the first television program for the first residual time length;

logically erasing from the memory device any prerecorded portions therein sufficient to provide the first amount of the memory;

receiving, and outputting a display of, the broadcast of the first television program on the first channel of the broadcast network;

recording, for the first residual time length, the first television program in the first amount of the memory in the memory device;

stopping, at a first time during the recording of the first television program, the output of the display of the broadcast of the first television program, wherein a first portion of the first amount of memory stores an outputted portion of the first television program from the beginning of the recording of the first television program to the first time, and wherein a second portion of the first amount of memory stores an un-outputted portion of the first television program beginning from the first time, and wherein the second portion of the first amount of memory comprises at least one byte;

selecting a second said EPG entry chronologically following the first said EPG entry and having a corresponding second television program of a predetermined time length being broadcast on a second channel;

estimating a second amount of memory in the memory device sufficient to record the predetermined time length of the second television program;

logically erasing from the memory device the first portion of the first amount of memory without logically erasing from the memory device the second portion of the first amount of memory;

receiving the broadcast of the second television program on the second channel of the broadcast network;

recording the second television program in the second amount of memory in the memory device;

outputting, after said stopping, the display of the broadcast of the first television program from a play back of the first television program in the first amount of the memory in the memory device from a corresponding point therein equal to or chronologically forward of the first time;

logically erasing from the memory device the second portion of the first amount of memory corresponding to the play back of the first television program; and forming a diagnostic corresponding to the logical erasing of the second portion of the first amount of memory, the diagnostic communicating a pause buffer inventory stored in the first amount of memory.

22. The system of claim 21, wherein the logically erasing from the memory device further comprises:

logically erasing any prerecorded first portions of the first amount of memory sufficient to provide the second amount of memory in the memory device.

23. The system of claim 21, wherein the outputting after said stopping and the logically erasing of the second portion of the first amount of memory are substantially simultaneous.

24. The system of claim 21, wherein the second portion of the first amount of memory has a predetermined time length.

25. The system of claim 21, wherein forming the diagnostic further comprises outputting the diagnostic in a visible display characterizing an availability of the portion of the first television program stored in the second portion of the first amount of memory for a playback thereof.

* * * * *